(12) United States Patent
Habtemichael et al.

(10) Patent No.: US 11,207,958 B2
(45) Date of Patent: Dec. 28, 2021

(54) VEHICLE DOOR ARRANGEMENT CONFIGURED TO PREVENT OVERLAP

(71) Applicant: Ford Global Technologies, LLC, Dearborn, MI (US)

(72) Inventors: Yishak Habtemichael, Detroit, MI (US); Jeffrey Comfort, Saline, MI (US); William Moore Sherwood, Beverly Hills, MI (US); Steven Angus, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 16/525,796

(22) Filed: Jul. 30, 2019

(65) Prior Publication Data

US 2021/0031601 A1 Feb. 4, 2021

(51) Int. Cl.
*B60J 5/04* (2006.01)

(52) U.S. Cl.
CPC ........... *B60J 5/0477* (2013.01); *B60J 5/0472* (2013.01); *B60J 5/0493* (2013.01)

(58) Field of Classification Search
CPC ....... B60J 5/0477; B60J 5/0472; B60J 5/0493
USPC .................................................... 296/146.9
See application file for complete search history.

(56) References Cited

U.S. PATENT DOCUMENTS

| 5,137,325 A | 8/1992 | Ohya |
| 2009/0218851 A1* | 9/2009 | Anderson ............. B60J 5/0451 296/187.03 |
| 2020/0180535 A1* | 6/2020 | Kito ....................... C08L 77/06 |
| 2020/0207425 A1* | 7/2020 | Grumm .................. B62D 29/04 |

FOREIGN PATENT DOCUMENTS

| JP | H0796743 A | 4/1995 |
| JP | 2007253785 A | 10/2007 |

OTHER PUBLICATIONS

Photos: Rolls-Royce Phantom 2003 Pictures, website cars-data.com 2009-2019, downloaded from https://www.crs-data.com/en/pictures-rolls-royce-phantom-2003/2238/8 on Jun. 27, 2019.
Photos: Vauxhall Meriva 2010—First Interior Photos, CAR Magazine, downloaded from https://www.carmagazine.co.uk/car-news/first-official-pictures/vauxhall/vauxhall-meriva-2010-first-interior-photos/ again on Jul. 26, 2019.

* cited by examiner

*Primary Examiner* — Hilary L Gutman
(74) *Attorney, Agent, or Firm* — David Coppiellie; Carlson, Gaskey & Olds, P.C.

(57) ABSTRACT

An exemplary motor vehicle includes a first door on a first side of the motor vehicle including a first pad adjacent a rear edge of the first door, and a second door on the first side of the motor vehicle including a second pad adjacent a front edge of the second door. Further, the first pad and second pad are arranged such that, in a first condition, the first pad and second pad are spaced-apart from one another and, in a second condition, the first pad and second pad contact one another to prevent overlap of the first door and second door.

11 Claims, 8 Drawing Sheets

VEHICLE DOOR ARRANGEMENT CONFIGURED TO PREVENT OVERLAP

TECHNICAL FIELD

This disclosure relates to a motor vehicle with a door arrangement configured to prevent overlap of the doors, and a corresponding method.

BACKGROUND

Motor vehicles include doors used for entering and exiting the vehicle. Most vehicles on the market today include doors hinged adjacent a front edge of the door. Some vehicles include coach doors, which are hinged adjacent a rear, trailing edge of the door.

SUMMARY

A motor vehicle according to an exemplary aspect of the present disclosure includes, among other things, a first door on a first side of the motor vehicle including a first pad adjacent a rear edge of the first door, and a second door on the first side of the motor vehicle including a second pad adjacent a front edge of the second door. The first pad and second pad are arranged such that, in a first condition, the first pad and second pad are spaced-apart from one another and, in a second condition, the first pad and second pad contact one another to prevent overlap of the first door and second door.

In a further non-limiting embodiment of the foregoing motor vehicle, the first door is configured to open and close by rotation about a hinge arranged adjacent a front edge of the first door, and the second door is configured to open and close by rotation about a hinge arranged adjacent a rear edge of the second door.

In a further non-limiting embodiment of any of the foregoing motor vehicles, the first door is configured to open and close relative to a first opening, and the second door is configured to open and close relative to a second opening.

In a further non-limiting embodiment of any of the foregoing motor vehicles, the first opening and the second opening are separated by a vertical support of the motor vehicle.

In a further non-limiting embodiment of any of the foregoing motor vehicles, the first pad is vertically aligned relative to the second pad.

In a further non-limiting embodiment of any of the foregoing motor vehicles, the first pad is spaced-apart from a bottom edge of the first door by a dimension within a range of about 40%-60% of a height of the first door, and the second pad is spaced-apart from a bottom edge of the second door by a dimension within a range of about 40%-60% of a height of the second door.

In a further non-limiting embodiment of any of the foregoing motor vehicles, the first pad is located above a latch of the first door, and the second pad is located above a latch of the second door.

In a further non-limiting embodiment of any of the foregoing motor vehicles, the first pad and second pad are formed of a polymer material.

In a further non-limiting embodiment of any of the foregoing motor vehicles, the first pad includes a first substantially planar contact face lying in a common plane with a rear edge of the first door, and the second pad includes a second substantially planar contact face lying in a common plane with a front edge of the second door, and the first contact face and second contact face are configured to directly contact one another in the second condition.

In a further non-limiting embodiment of any of the foregoing motor vehicles, the first pad includes a plurality of ribs between the first contact face and a body of the first door, and the second pad includes a plurality of ribs between the second contact face and a body of the second door.

In a further non-limiting embodiment of any of the foregoing motor vehicles, the first pad is connected to the body of the first door by a first fastener, the second pad is connected to the body of the second door by a second fastener, the first pad includes a recess spaced from the first contact face and configured to accommodate the first fastener, and the second pad includes a recess spaced from the second contact face and configured to accommodate the first fastener.

A method according to an exemplary aspect of the present disclosure includes, among other things, preventing overlap of a first door and a second door of a motor vehicle by contacting a first pad mounted to the first door to a second pad mounted to the second door.

In a further non-limiting embodiment of the foregoing method, the first pad is mounted adjacent a rear edge of the first door and the second pad is mounted adjacent a front edge of the second door.

In a further non-limiting embodiment of any of the foregoing methods, the first door is configured to open and close by rotation about a hinge adjacent a front edge of the first door, and the second door is configured to open and close by rotation about a hinge adjacent a rear edge of the second door.

In a further non-limiting embodiment of any of the foregoing methods, the preventing step occurs in response to a force being exerted on a motor vehicle.

In a further non-limiting embodiment of any of the foregoing methods, the first pad is vertically aligned relative to the second pad.

In a further non-limiting embodiment of any of the foregoing methods, the first pad is spaced-apart from a bottom edge of the first door by a dimension within a range of about 40%-60% of a height of the first door, and the second pad is spaced-apart from a bottom edge of the second door by a dimension within a range of about 40%-60% of a height of the second door.

In a further non-limiting embodiment of any of the foregoing methods, the first pad includes a first substantially planar contact face lying in a common plane with a rear edge of the first door, the second pad includes a second substantially planar contact face lying in a common plane with a front edge of the second door, and during the preventing step, the first contact face and second contact face directly contact one another.

BRIEF DESCRIPTION OF THE DRAWINGS

In FIG. 1, the doors are closed.

In FIG. 2, the doors are open.

DETAILED DESCRIPTION

This disclosure relates to a motor vehicle with a door arrangement configured to prevent overlap of the doors, and a corresponding method. An exemplary motor vehicle includes a first door on a first side of the motor vehicle including a first pad adjacent a rear edge of the first door, and a second door on the first side of the motor vehicle including a second pad adjacent a front edge of the second door. Further, the first pad and second pad are arranged such that, in a first condition, the first pad and second pad are spaced-apart from one another and, in a second condition, the first pad and second pad contact one another to prevent overlap of the first door and second door. The disclosed arrangement prevents door overlap while being aesthetically pleasing and being relatively easy to manufacture and assemble. These and other benefits will be appreciated from the below description.

Figure 1:
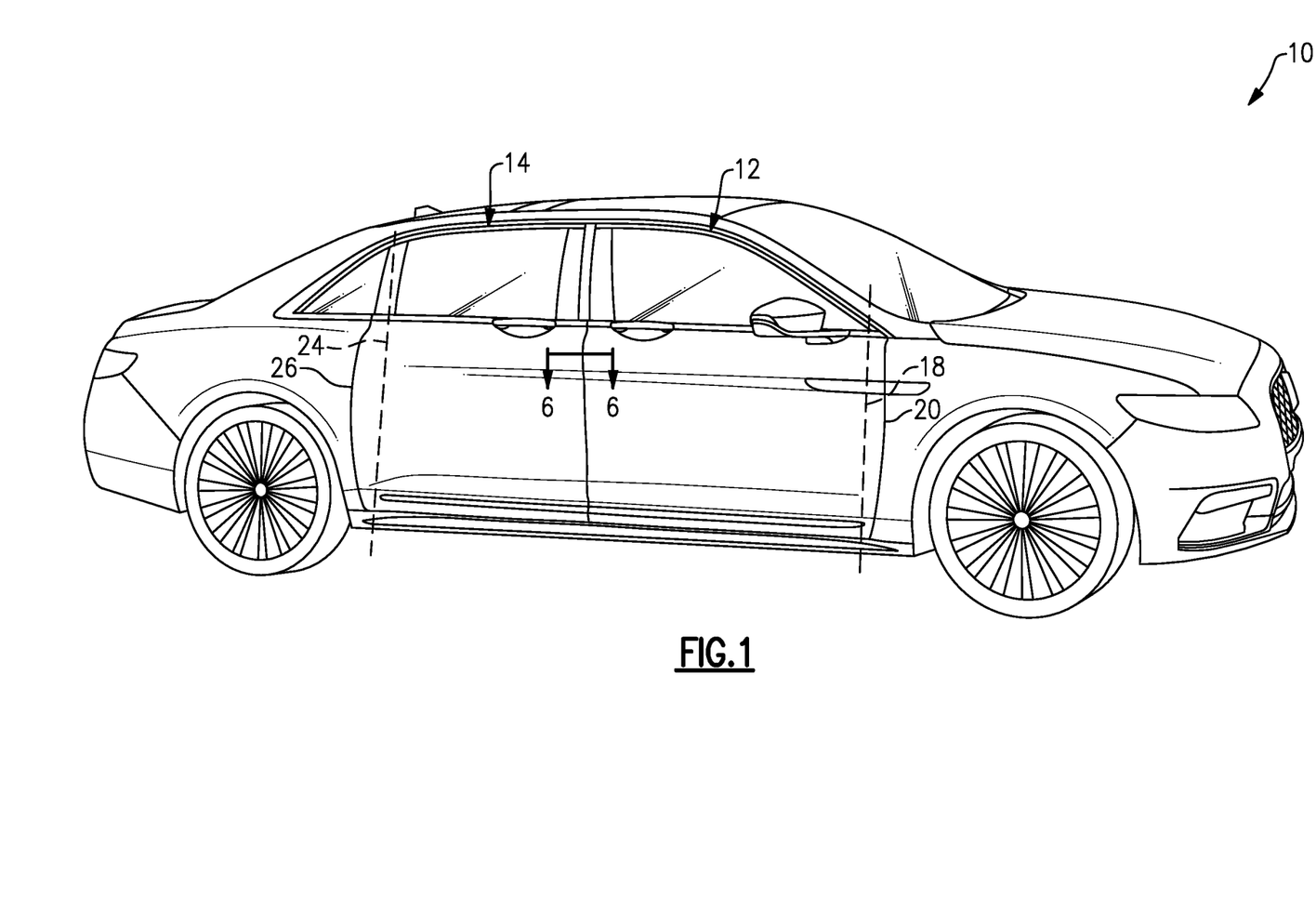
FIG. 1 is a side-perspective view of a motor vehicle including an exemplary door arrangement.

FIG. 1 is a side-perspective view of a motor vehicle 10 ("vehicle 10") including an exemplary door arrangement. While only one side of the vehicle 10 is shown in FIG. 1, it should be understood that the opposite side of the vehicle 10 includes a similar door arrangement.

The side of the vehicle 10 shown in FIG. 1 includes a first door 12, which is a front passenger side door, and a second door 14, which is a rear passenger side door. The first door 12 is configured to open and close relative to a first opening 16 (FIG. 2) in a body of the vehicle 10 by rotation about an axis 18 via a hinge (not shown) adjacent a front edge 20 of the first door 12. The second door 14, on the other hand, is configured to open and close relative to a second opening 22 (FIG. 2) in the body of the vehicle 10 by rotation about an axis 24 via a hinge (not shown) adjacent a rear edge 26 of the second door 14. The first and second doors 12, 14 may be referred to as coach doors. The second door 14 is a coach door. Thus, the vehicle 10 includes a combination of a front-hinged door adjacent a rear-hinged door on each side of the vehicle. While the present disclosure has particular benefits in the context of coach doors, various aspects of this disclosure may be used relative to other door arrangements.

Figure 2:
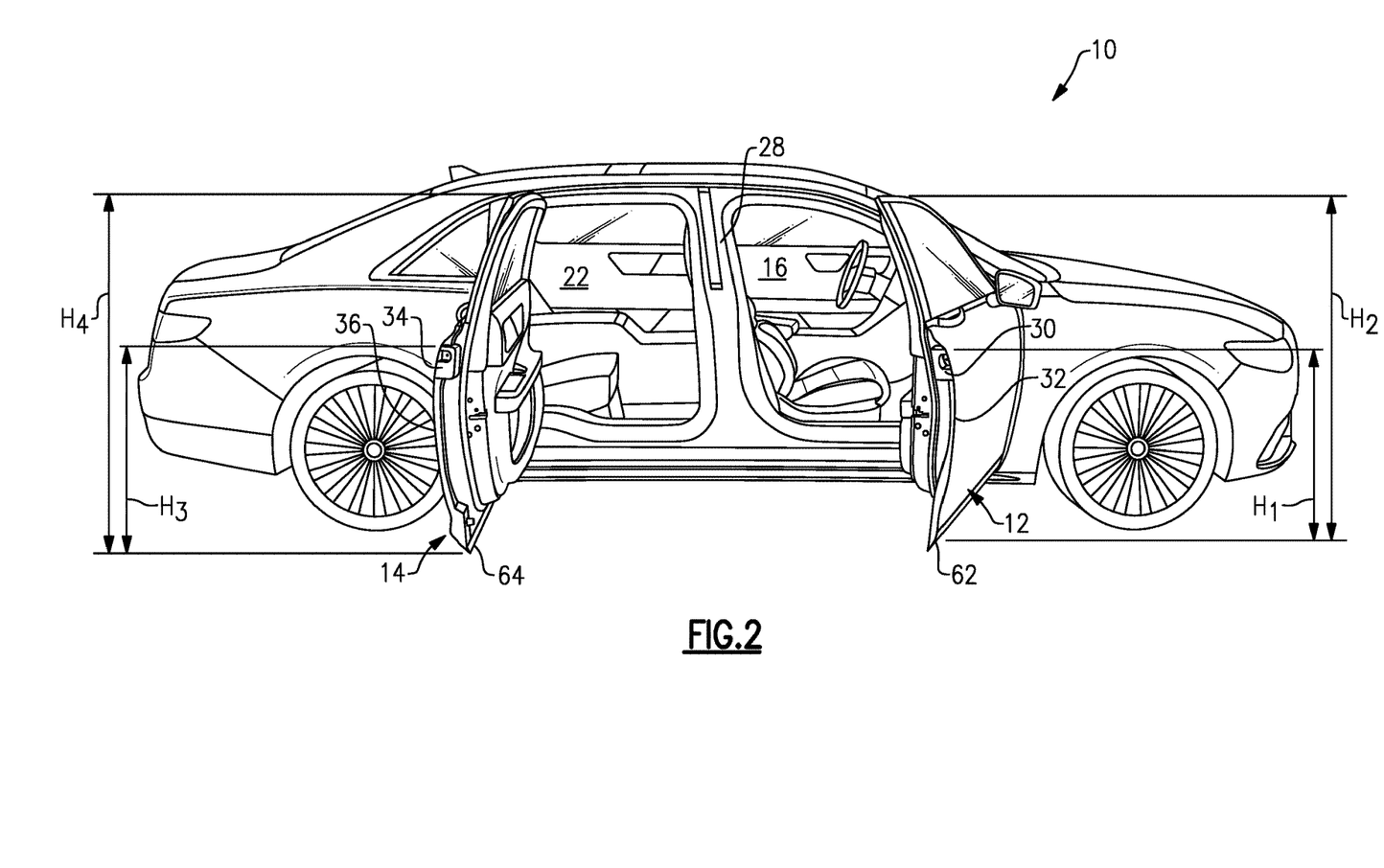
FIG. 2 is a side view of the motor vehicle including the exemplary door arrangement.

In FIG. 2, the first and second openings 16, 22 are separated by a vertical support 28 of the vehicle 10, namely a B-pillar of the vehicle 10. In some examples, there is no vertical support separating the first and second openings, and thus the first and second doors 12, 14 may be configured to open and close to cover respective portions of a larger opening.

The door arrangement of this disclosure is configured to prevent overlap of the first and second doors 12, 14. Reference to overlap, in this disclosure, refers to overlap in a direction normal to a centerline of the vehicle 10. For instance, during normal use conditions, the first and second doors 12, 14 are spaced-apart from one another relative to a length of the vehicle 10 such that the first and second doors 12, 14 may be opened and closed independent of one another. If the first and second doors 12, 14 were overlapped, the inner door (i.e., door closer to the centerline of the vehicle 10) would not be able to open without first opening the outer door. This disclosure prevents such overlap.

With reference to FIG. 2, the first door 12 includes a first pad 30 adjacent a rear edge 32 thereof, and the second door 14 includes a second pad 34 adjacent a front edge 36 thereof. It should be understood that the first and second pads 30, 34 may be arranged substantially similarly. The first and second pads 30, 34 may be sized and/or shaped differently depending on the size and configuration of the corresponding door. Further, the rear edge 32 and the front edge 36 are the rear-most and front-most edges, respectively, of the first and second doors 12, 14. The edges may be hemmed edges.

Figure 3:
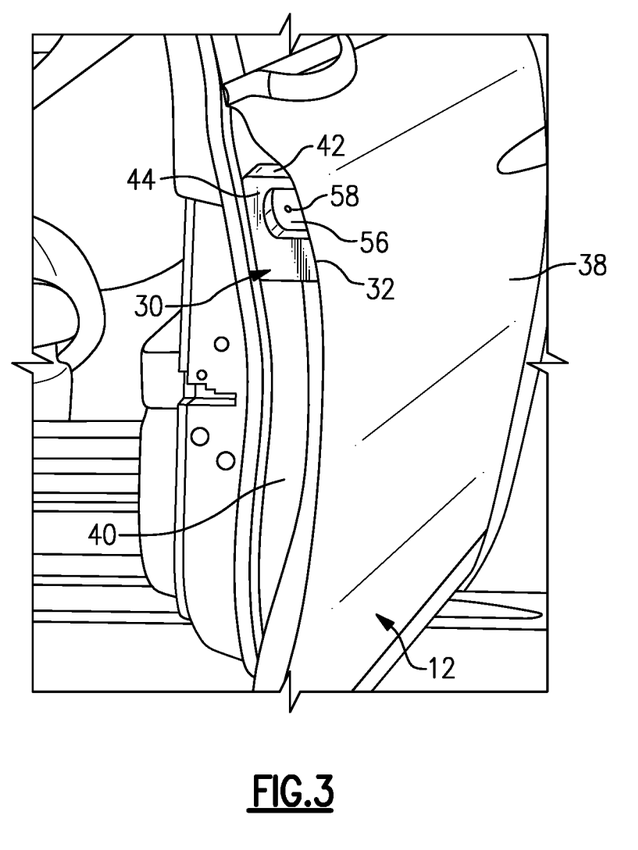
FIG. 3 is a close-up view of a portion of the front door of FIG. 2.

FIG. 3 is a close-up view of the first pad 30. As shown in FIG. 3, the first pad 30 is arranged laterally inside an outer door panel 38 and is arranged axially (i.e., along the length of the vehicle 10, when the first door 12 is closed) between a body 40 and the rear edge 32 of the first door 12. The first pad 30 is vertically arranged above a latch of the first door 12, but need not be arranged above the latch in all examples. The second pad 34 may also be arranged vertically above a latch of the second door 14.

Figure 4:
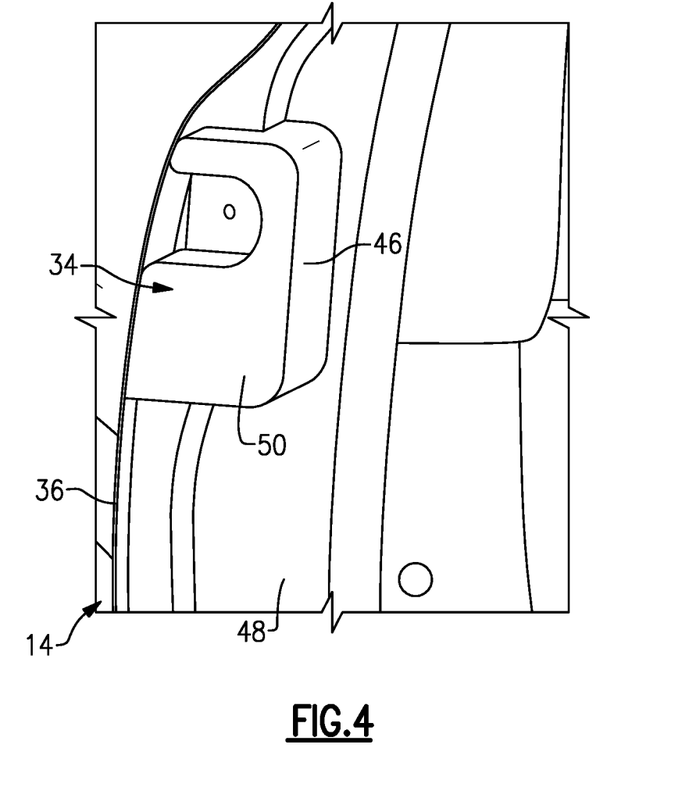
FIG. 4 is a close-up view of a portion of the rear door of FIG. 2.

The body 40 is spaced forward of the rear edge 32 and projects inward from the outer door panel 38. The first pad 30 includes a body 42 in direct contact with the body 42 of the first door 12 and extending in a rearward direction to a first contact face 44. The first contact face 44 is substantially planar. With reference to FIG. 4, the second pad 34 likewise includes a body 46 in direct contact with a body 48 of the second door 14 and extending in a forward direction to a second contact face 50, which is also substantially planar.

The first and second pads 30, 34 are formed of a polymer material in one example. In a particular example, the first and second pads 30, 34 are formed of a hard plastic material such as PVC, polycarbonate, or polythene, as examples. The first and second pads 30, 34 may be formed by injection molding, as one example. The first and second doors 12, 14 may be formed of a metallic material. This disclosure is not limited to polymer pads and metallic doors, however.

Figure 5:
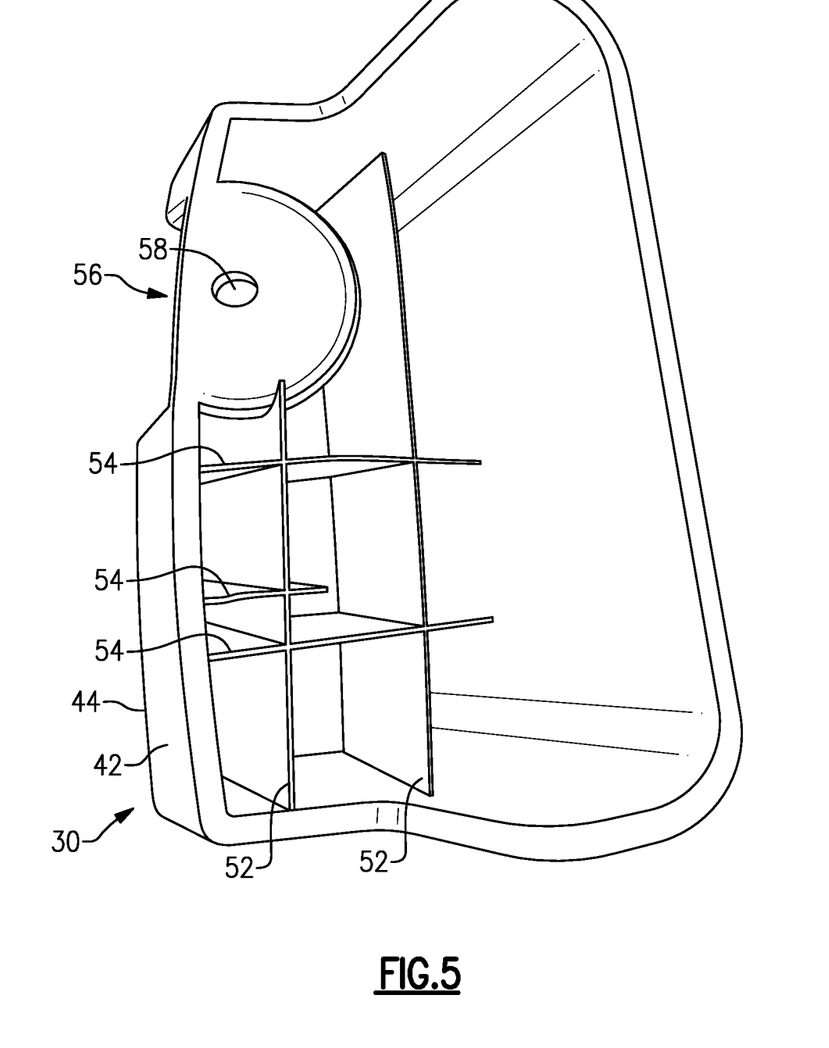
FIG. 5 illustrates an example pad from a rear perspective.

In order to increase the strength and rigidity of the first and second pads 30, 34, the pads may include reinforcing ribs. With reference to FIG. 5, which illustrates the first pad 30 from a rear perspective, the first pad 30 includes vertical ribs 52 and horizontal ribs 54 intersecting the vertical ribs 52. When the first pad 30 is attached to the first door 12, for example, the vertical and horizontal ribs 52, 54 directly contact the body 40 of the first door 12 and extend to a backside of the first contact face 44. While not illustrated, it should be understood that the second pad 34 includes a similar rib arrangement.

With joint reference to FIGS. 3 and 5, the first pad 30 is attached to the first door 12 by a fastener (not shown), such as a bolt, screw, rivet, or the like. The first pad 30 includes a recess 56 spaced forward of the first contact face 44 and including an opening 58 for receiving a fastener. The recess 56 is sized to accommodate a tool for securing the fastener.

Figure 6:
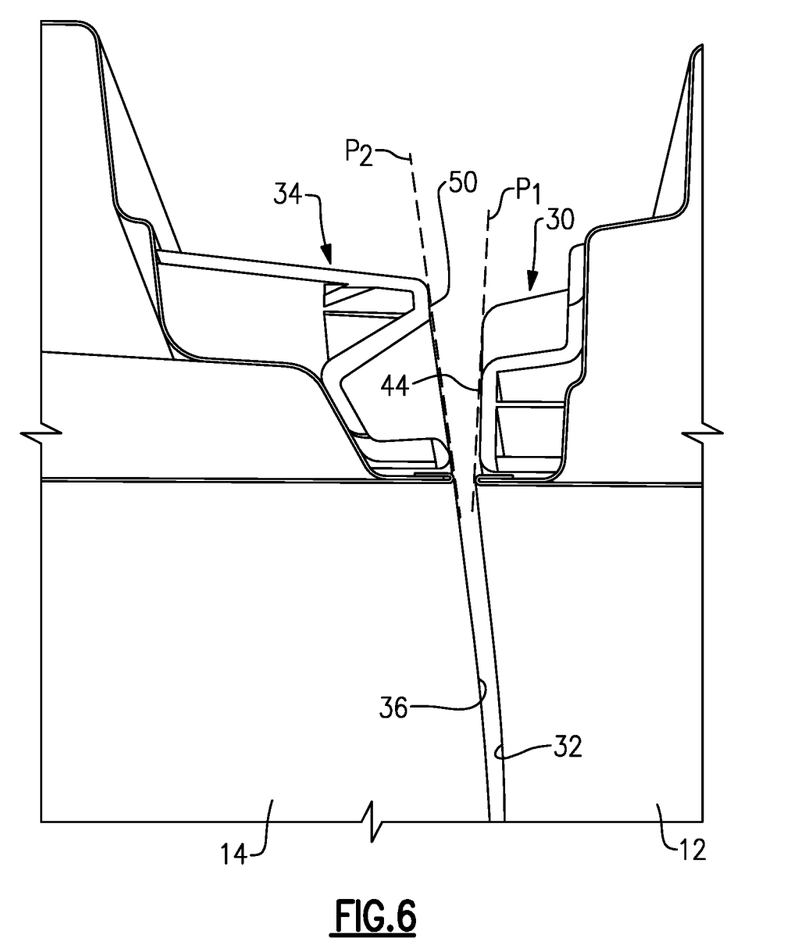
FIG. 6 is a cross-sectional view taken along line 6-6 from FIG. 1, and illustrates a relative position of a first pad and a second pad.

With reference to FIG. 6, the first pad 30 and the second pad 34 are mounted to the respective first and second doors 12, 14 such that they are vertically aligned with one another. In particular, with reference to FIG. 2, the first pad 30 is spaced-apart from a bottom edge 62 of the first door 12 by a dimension $H_1$ within a range of about 40%-60% of an overall height $H_2$ of the first door 12. Likewise, the second pad 34 is spaced-apart from a bottom edge 64 of the second door 14 by a dimension $H_3$ within a range of about 40%-60% of an overall height $H_4$ of the second door 14. In this example, the heights $H_1$ and $H_3$ are substantially equal. The heights $H_2$ and $H_4$ are also substantially equal. The heights $H_1$ and $H_3$ are measured relative to an upper edge of the first and second pads 30, 34, in this example, however the heights $H_1$ and $H_3$ could be measured relative to a midpoint or a lower edge of the pads in other examples. In a particular example, a length of the first and second pads 30, 34 is such that an entirety of the first and second pads 30, 34 fits within the range of 40%-60% of the overall door height. Arranging the first and second pads 30, 34 at about 40-60% of the overall height of the respective door increases the ability of the first and second pads 30, 34 to prevent the first and second doors 12, 14 from overlapping relative to pads that are arranged elsewhere along a height of a door, namely adjacent a lower edge of a door, for example.

FIG. 6 is representative of a first condition in which the first and second contact faces 44, 50 are spaced-apart from one another along a length of the vehicle 10 (i.e., generally the left-to-right direction, in FIG. 6). In a second condition, the first and second contact faces 44, 50 are configured to directly contact one another. In order to permit direct contact between the first and second contact faces 44, 50, the first and second contact faces 44, 50 are arranged in respective planes that include a respective door edge.

In particular, in this example, the first contact face 44 lies in a first plane $P_1$. The rear edge 32 of the first door 12 also lies in the first plane $P_1$. The second contact face 50 lies in a second plane $P_2$, and the front edge 36 of the second door 14 also lies in the second plane $P_2$. In one example, the first and second planes $P_1$, $P_2$ are substantially parallel to one another and extend in a direction normal to a centerline of the vehicle 10.

In the second condition, the first and second contact faces 44, 50 come into contact with one another and prevent the rear edge 32 and front edge 36 from overlapping one another, which would otherwise prevent the inner door from opening without first opening the outer door.

Figure 7A:
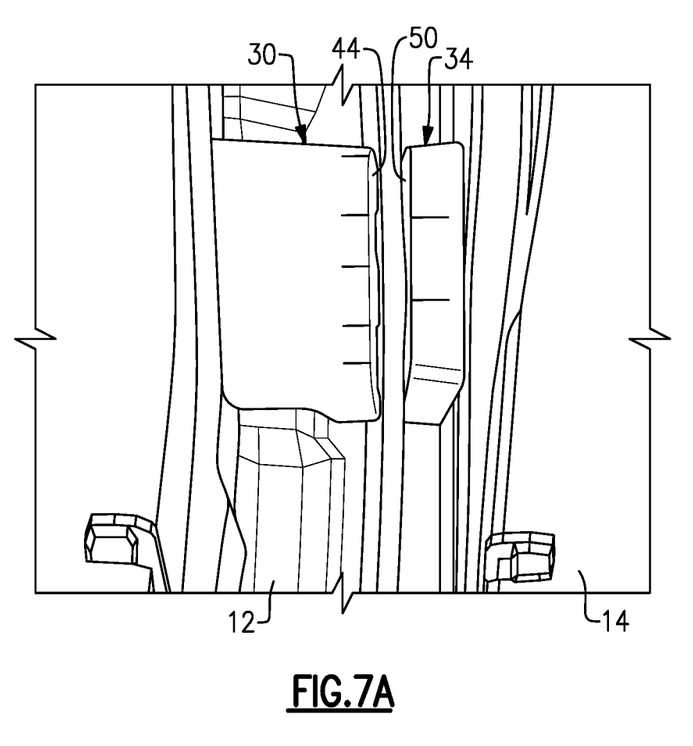
FIG. 7A illustrates a relative position of a first pad and a second pad in a first condition.
Figure 7B:
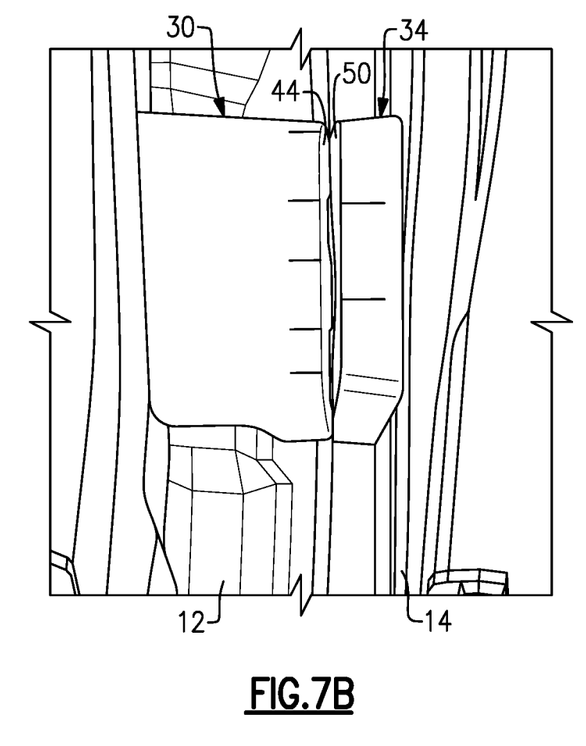
FIG. 7B illustrates a relative position of a first pad and a second pad in a second condition.

FIGS. 7A and 7B illustrate the first and second pads 30, 34 from a different perspective and are representative of first and second operating conditions, respectively, of the first and second pads 30, 34. In FIG. 7A, as in FIG. 6, the first and second doors 12, 14 are closed and the first and second contact faces 44, 50 are spaced-apart from one another. In this sense, FIG. 7A is representative of a normal use condition of the doors of the vehicle 10.

FIG. 7B is representative of a second condition in which a force has been exerted on the vehicle 10 such that the first and second contact faces 44, 50 come into direct contact with one another. In a particular example, the first and second contact faces 44, 50 do not contact the vertical support 28 (i.e., the B-pillar) of the vehicle 10. Rather, the first and second contact faces 44, 50 contact themselves. Because of the arrangement discussed above, the first and second pads 30, 34 prevent the first door 12 and second door 14 from overlapping. Thus, despite the force exerted on the vehicle 10, either of the first and second doors 12, 14 can be opened independent of one another.

Figure 8:
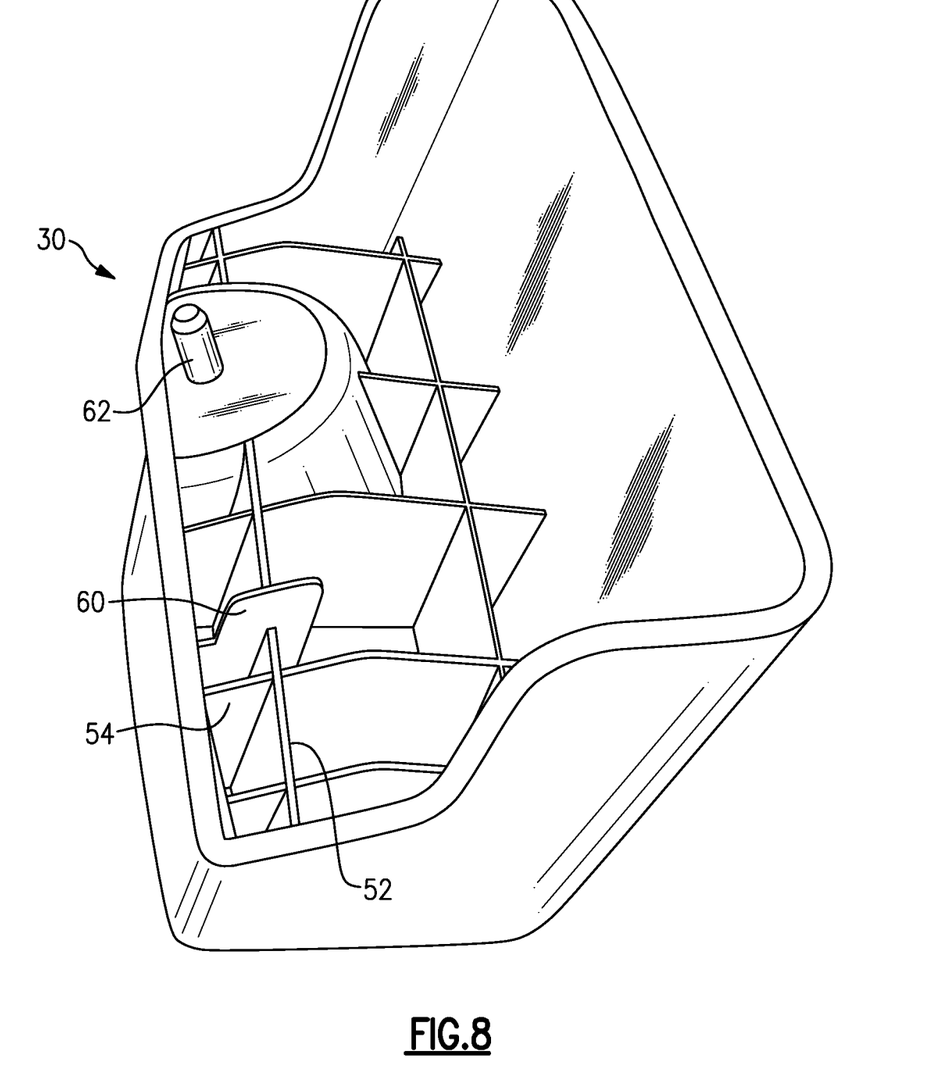
FIG. 8 illustrates another example pad configuration from a rear perspective.

FIG. 8 is a rear perspective view of another configuration of the first pad 30. FIG. 8 illustrates an aspect of this disclosure relating to alignment of the first and second pads 30, 34 during assembly. Specifically, the first and second pads 30, 34 may include a locating feature to assist with aligning the pad relative to the respective door 12, 14. An example locating feature 60 in FIG. 8 is a tab projecting further toward a respective door than the ribs 52, 54. The respective door may include a channel configured to receive the locating feature 60. FIG. 8 also illustrates a rivet 62, which again is an example type of fastener that may be used to connect the first and second pads 30, 34 to the respective door 12, 14.

It should be understood that terms such as "about," "substantially," and "generally" are not intended to be boundaryless terms, and should be interpreted consistent with the way one skilled in the art would interpret those terms. It should also be understood that directional terms such as "front," "rear," "side," "inner," "outer," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a first door on a first side of the motor vehicle including a first pad adjacent a rear edge of the first door;
a second door on the first side of the motor vehicle including a second pad adjacent a front edge of the second door; and
wherein the first pad and second pad are arranged such that, in a first condition, the first pad and second pad are spaced-apart from one another and, in a second condition, the first pad and second pad contact one another to prevent overlap of the first door and second door,
wherein the first pad includes a first substantially planar contact face lying in a common plane with a rear edge of the first door,
wherein the second pad includes a second substantially planar contact face lying in a common plane with a front edge of the second door,
wherein the first contact face and second contact face are configured to directly contact one another in the second condition,
wherein the first pad includes a plurality of ribs directly contacting a body of the first door and extending to a backside of the first contact face,
wherein the second pad includes a plurality of ribs directly contacting a body of the second door and extending to a backside of the second contact face,
wherein the first pad includes a tab projecting further toward the body of the first door than the plurality of ribs of the first pad such that the tab of the first pad is configured to be inserted into a channel of the body of the first door, and
wherein the second pad includes a tab projecting further toward the body of the second door than the plurality of ribs of the second pad such that the tab of the second pad is configured to be inserted into a channel of the body of the second door.

2. The motor vehicle as recited in claim 1, wherein:
the first door is configured to open and close by rotation about a hinge arranged adjacent a front edge of the first door, and
the second door is configured to open and close by rotation about a hinge arranged adjacent a rear edge of the second door.

3. The motor vehicle as recited in claim 2, wherein:
the first door is configured to open and close relative to a first opening, and
the second door is configured to open and close relative to a second opening.

4. The motor vehicle as recited in claim 3, wherein the first opening and the second opening are separated by a vertical support of the motor vehicle.

5. The motor vehicle as recited in claim 1, wherein the first pad is vertically aligned relative to the second pad.

6. The motor vehicle as recited in claim 5, wherein:
the first pad is spaced-apart from a bottom edge of the first door by a dimension within a range of about 40%-60% of a height of the first door, and
the second pad is spaced-apart from a bottom edge of the second door by a dimension within a range of about 40%-60% of a height of the second door.

7. The motor vehicle as recited in claim 6, wherein:
the first pad is located above a latch of the first door, and
the second pad is located above a latch of the second door.

8. The motor vehicle as recited in claim 1, wherein the first pad and second pad are formed of a polymer material.

9. The motor vehicle as recited in claim 1, wherein:
the first pad is connected to the body of the first door by a first fastener,
the second pad is connected to the body of the second door by a second fastener,
the first pad includes a recess spaced from the first contact face and configured to accommodate the first fastener, and
the second pad includes a recess spaced from the second contact face and configured to accommodate the first fastener.

10. The motor vehicle as recited in claim 1, wherein:
the plurality of ribs of the first pad includes a plurality vertical ribs and a plurality of horizontal ribs intersecting the vertical ribs, and
the plurality of ribs of the second pad includes a plurality vertical ribs and a plurality of horizontal ribs intersecting the vertical ribs.

11. The motor vehicle as recited in claim 1, wherein:
the first pad is spaced-apart from a bottom edge of the first door by a dimension such that an entirety of the first pad is within 40%-60% of a height of the first door,
the second pad is spaced-apart from a bottom edge of the second door by a dimension such that an entirety of the second pad is within 40%-60% of a height of the first door.

* * * * *